US005606409A

United States Patent [19]

Schneiter

[11] Patent Number: 5,606,409
[45] Date of Patent: Feb. 25, 1997

[54] LASER RANGING SYSTEM CALIBRATION DEVICE

[75] Inventor: John L. Schneiter, Latham, N.Y.

[73] Assignee: General Electric Company, Schenectady, N.Y.

[21] Appl. No.: 364,325

[22] Filed: Dec. 27, 1994

[51] Int. Cl.$^6$ ............................. G01C 3/08; G01C 5/00
[52] U.S. Cl. ................. 356/4.02; 356/3.04; 356/3.06; 356/3.07
[58] Field of Search ..................... 356/4.02, 3.01, 356/3.04, 3.06, 3.07, 3.03

[56] References Cited

U.S. PATENT DOCUMENTS

| | | |
|---|---|---|
| 4,068,952 | 1/1978 | Erbert et al. . |
| 4,121,890 | 10/1978 | Braun . |
| 4,963,017 | 10/1990 | Schneiter et al. ........................ 356/1 |
| 5,032,023 | 7/1991 | Schneiter ................................ 356/1 |
| 5,061,062 | 10/1991 | Schneiter ................................ 356/1 |
| 5,082,362 | 1/1992 | Schneiter ................................ 356/1 |
| 5,282,014 | 1/1994 | Ruhl, Jr. et al. . |

OTHER PUBLICATIONS

A paper entitled, "A Reconfigurable Laser Ranging Instrument," Proc. SPIE Conf. on Optical Tools for Manufacturing and Advanced Automation, Sep. 7–10, 1993, Boston, MA.

Primary Examiner—Stephen C. Buczinski
Attorney, Agent, or Firm—Donald S. Ingraham

[57] ABSTRACT

A calibration device for a laser ranging system includes an interferometer assembly and a beam path magnifier assembly which is optically coupled to the interferometer assembly to receive a calibration beam therefrom and to the laser ranging system to receive a laser ranging beam therefrom. The calibration beam and the laser ranging beam enter the beam path magnifier assembly such that they pass along equidistant paths and so that the calibration beam is detected by the interferometer assembly to provide a precise measurement of the distance the calibration beam traveled and the laser ranging beam is detected by the laser ranging system to provide a measurement of the distance traveled by the laser ranging beam along the calibration optical path. Comparison of the two readings provides calibration data for the laser ranging system. The beam path multiplier assembly includes means for varying a folded calibration optical path length to provide a range of calibration beam path lengths. The means for varying the folded calibration optical path length include displaceable optical components disposed such that the folded calibration optical path length is determined by more than two reflections within the beam path magnifier assembly.

11 Claims, 4 Drawing Sheets

LASER RANGING SYSTEM CALIBRATION DEVICE

BACKGROUND OF THE INVENTION

Laser ranging systems that optically determine the distance to an object are well adapted for use as precise metrology equipment. For example, such precise metrology equipment is necessary to control or check industrial processes requiring accurate machining or fabrication of parts to tight tolerances. One example of such a laser ranging system is a variable depth range camera as described in U.S. Pat. Nos. 4,963,017; 5,032,023; 5,061,062; and 5,082,362, each of which is assigned to the assignee of the present invention and which are incorporated herein by reference.

One of the problems faced by developers and users of precise metrology equipment is calibration drift due to thermal expansion effects and equipment wear. These difficulties have necessitated the use of elaborate environmental controls to maintain the precision of the metrology equipment, such as the installation of laser ranging equipment in temperature controlled rooms. The costs to build and operate such environmental equipment increases fabrication costs; further, the limited mobility of such equipment can impede the fabrication process.

Even with stable environmental conditions, precision metrology equipment requires downtime for periodic calibration. Such calibration typically involves the measurement of a known object and comparison of the results of the measurement with previously obtained results; such a procedure is both time consuming and impractical for metrology devices having large working volumes (or ranges of measurement) due to the costs associated with designing, building, and storing large precision surfaces for use in calibration runs. Another type of calibration system employs a target on a rail; the target moves along a path within the depth of field of the laser ranging system. Comparing the laser ranging system's range determination with the simultaneously-determined range values obtained with an interferometer coupled to the rail system provides calibration data. Because this type of calibration system must have one dimension as long as the longest range that is to be used in the calibration process, as a practical matter they are limited to small depths of range and, because of their size and associated difficulty in moving and storage, do not lend themselves to frequent calibration of the metrology equipment. Further, aside from the time and expense of having the equipment out of service during the calibration operation, infrequent calibration runs raises the concern the instrument has become uncalibrated during a period when it is used for production runs.

The development of non-contact laser ranging equipment, such as the variable depth range camera noted above, having a large working volume and that is well adapted for use in a shop-floor environment has led to a need for a calibration system that is fast. The calibration system desirably is both fast and readily attached to the laser ranging system to enable the laser ranging system to be recalibrated at short intervals (e.g., every 5 to 10 minutes, or between each measurement series in the fabrication of a workpiece). The calibration system is also desirably compact and rugged to permit reliable use in a manufacturing environment.

SUMMARY OF THE INVENTION

A calibration device for a laser ranging system includes an interferometer assembly and a beam path magnifier assembly which is optically coupled to the interferometer assembly to receive a calibration beam therefrom and to the laser ranging system to receive a laser ranging beam therefrom. The calibration beam and the laser ranging beam enter the beam path magnifier assembly along parallel paths and each travel along the same calibration optical path to a location (each beam having traveled the same distance to the location) at which each beam is respectively reflected back through the beam path magnifier assembly; the calibration beam is detected by the interferometer assembly to provide a precise measurement of the distance the calibration beam traveled and the laser ranging beam is detected by the laser ranging system to provide a measurement of the distance traveled by the laser ranging beam along the calibration optical path. Comparison of the two readings provides calibration data for the laser ranging system.

The beam path multiplier assembly includes means for varying a folded calibration optical path length, a retroreflector disposed to reflect the calibration beam back to the interferometer assembly, and a target disposed to reflect the laser ranging beam to the laser ranging system. The means for varying the folded calibration optical path length include displaceable optical components disposed such that the folded calibration optical path length is determined by more than two reflections within the beam path magnifier assembly.

In one embodiment of the present invention, the beam path magnifier assembly includes a stationary reflector assembly and a translational reflector assembly, each reflector assembly comprising a plurality of beam deflector modules disposed to define a folded calibration optical path. The means for varying the optical path length includes a displacement mechanism coupled to displace the translational reflector assembly with respect to the stationary reflector assembly while maintaining the integrity of the folded calibration optical path.

In another embodiment of the present invention, the beam path magnifier assembly includes a rotatable beam coupling reflector and optical path assembly optically coupled thereto. The optical path assembly includes a stationary mirror and a translational mirror. The means for varying the folded calibration optical path length includes a displacement mechanism coupled to the translational mirror so as to displace that mirror in correspondence with the deflection angle of the rotatable beam coupling reflector such that the integrity of the folded calibration optical path is maintained.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

FIG. 3a is a side view of the invention; FIG. 3b is a first end view of the representation in FIG. 3a taken along the view shown as "1" in FIG. 3a; FIG. 3c is a top view of the representation in FIG. 3a along view shown as "2" in FIG. 3a; and FIG. 3d is a second end view of the representation in FIG. 3a taken along view shown as "3" in FIG. 3a.

DETAILED DESCRIPTION OF THE INVENTION

Figure 1:
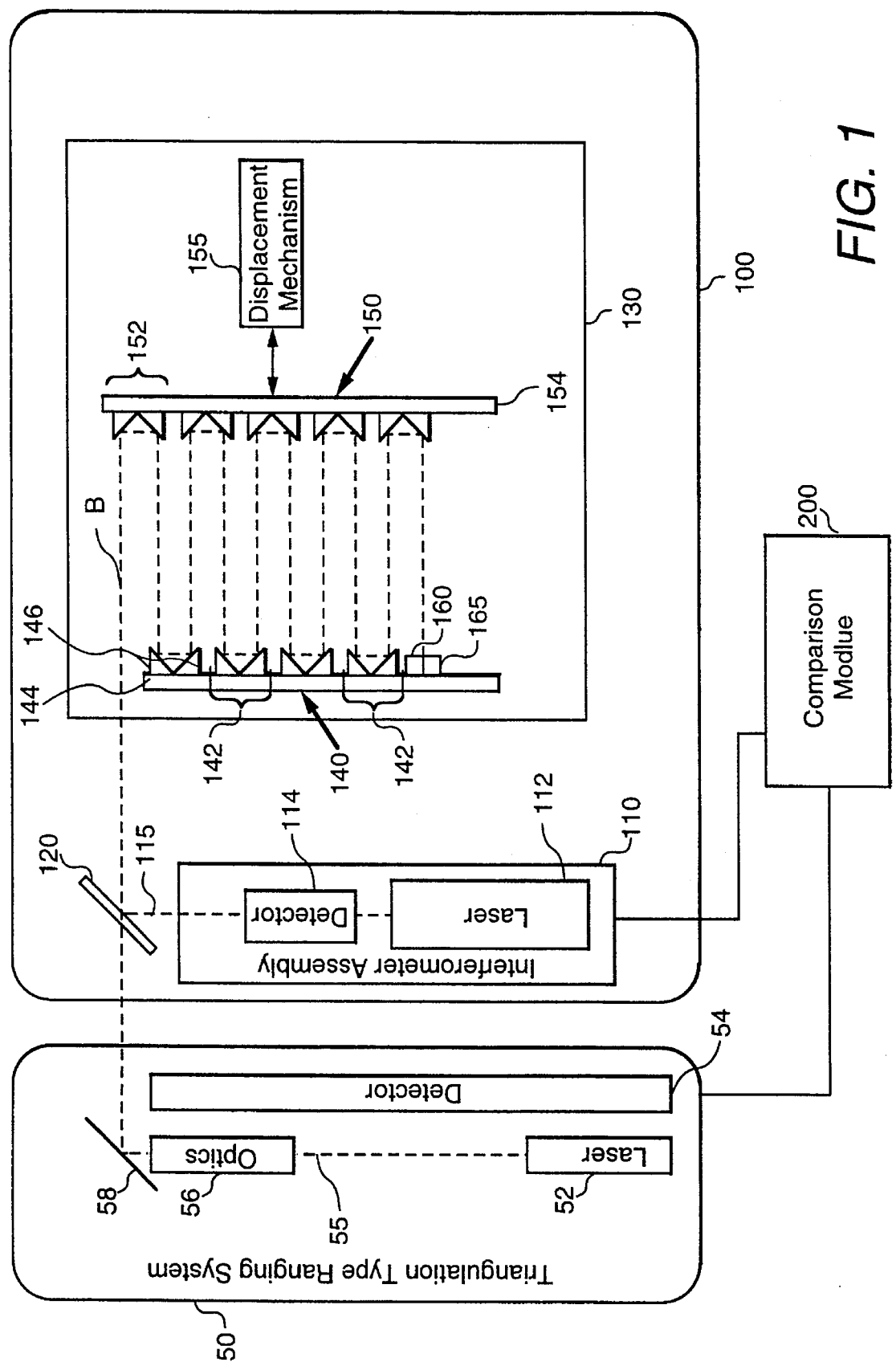
FIG. 1 is a partial schematic and partial block diagram view of a laser range system calibration device in accordance with one embodiment of this invention.

A calibration device 100 for a laser ranging system 50 comprises an interferometer assembly 110 and a beam path magnifier assembly 130, as illustrated in the FIGS. In use, calibration system 100 is coupled to a laser ranging system 50 for the purpose of generating calibration data for the ranging system by comparison of measurements of the distance traveled along a common beam path in beam path magnifier assembly 130. For purposes of explanation and not limitation, laser ranging system 50 is shown optically coupled to calibration device 100.

Laser ranging system 50 typically comprises a triangulation type non-contact variable depth camera as described in U.S. Pat. Nos. 4,963,017; 5,032,023; 5,061,062; and 5,082,362, each of which is assigned to the assignee of the present invention and which are incorporated herein by reference. Laser ranging system 50 comprises a laser 52 that generates a laser ranging beam 55 and a detector 54 disposed to receive laser ranging beam light reflected from a target along a path allowing for determination of the target range by triangulation. Laser ranging beam 55 typically passes through focusing optics 56 and is directed out of ranging system 50 via a beam deflector 58 that is adjustable so as to direct the beam in a selected direction. Laser ranging system 50 is typically adapted to be able to measure distances over a selected depth of field and with controllable resolution. For example, in manufacturing of items such as turbine blades, laser ranging system 50 typically has a depth of range of several inches to about 10 feet, with resolution possible to within one part in 4,000 of the depth of range.

Laser ranging system 50 is optically coupled to calibration device 100 such that laser ranging beam 55 generated by laser 52 passes into calibration device 100 and, when reflected by a target in beam path magnifier assembly 130, returns to detector 54 of ranging system 50. As used herein, "optically coupled" and the like refers to the use or disposition of components that enable the passage of an optical beam from one optical component to another such that the light beam passes along a selected path.

Interferometer assembly 110 typically comprises a laser source 112 that generates a calibration beam 115 that typically is of a frequency different than that of laser ranging beam 55. Interferometer assembly 110 further comprises an interferometer detector 114 disposed to receive the generated calibration beam 115 from laser source 112 and the portion of that beam that is reflected from beam path magnifier assembly 130 so as to detect interference fringe patterns between the generated and reflected beams. When starting from a known condition, or distance that the generated and reflected beam are traveling, counting of the interference fringe patterns (as the length of the path traversed by the beams is changed) provides a precise measurement of the change in length of the path.

Interferometer assembly 110 is optically coupled to beam path magnifier assembly 130 via an optical coupling mechanism 120 that is disposed to direct laser ranging beam 55 and calibration beam 115 into beam path magnifier assembly 130 along parallel paths. Optical coupling mechanism 120 typically comprises a beam splitter disposed to direct the return calibration beam into interferometer assembly 110 and to allow the laser ranging beam to pass through it undeflected. Laser ranging beam 50 and calibration beam 115 each pass into beam path magnifier assembly 130 adjacent to the other such that each beam travels the same distance into beam path magnifier assembly 130 before being reflected back out of assembly 130. The path that the beams follow through beam path magnifier assembly 130 constitutes the calibration optical path. Because the length of the calibration optical path for each beam is the same, comparison of the distance of the calibration optical path measured by laser ranging system 50 and interferometer assembly 110 provides calibration information.

Beam path magnifier assembly 130 is adapted to vary the folded calibration optical path length to provide a range of path distances to be measured by interferometer assembly 110 and laser ranging system 50. As used herein, "folded" or the like refers to an optical path that is made of a plurality of segments, the light being deflected between respective segments so that the length of the calibration optical path is a function of the length of each segment and the number of segments; the folded nature of the segments enables the physical size of beam path magnifier assembly to be less than the maximum desired range (for calibration purposes) of the calibration optical beam path.

In one embodiment of the present invention, as illustrated in FIG. 1, beam path magnifier assembly 130 comprises a stationary reflector assembly 140 and a translational reflector assembly 150. Stationary reflector assembly comprises a plurality of beam deflector modules 142 disposed on a planar backing member 144. Each beam deflector module 142 is adapted to reverse the direction of an incident beam but along a path slightly offset from the incident path. For example, each beam deflector module 142 typically comprises two reflector elements 146 each disposed at about 45° angles with respect to the plane of the surface of backing member 142 such that an incident light beam (passing along a path that is orthogonal to the plane of backing member 144) is deflected from one reflector element 146 to the second reflector element 146, which is also disposed at a 45° angle to backing member 144 (opposite to the angle of the first reflector element) so that the light beam is redirected on a path (which path comprises the next segment of the folded optical calibration path) orthogonal to backing member 144 but offset from the incident path to that beam deflector module 142.

Translational reflector assembly 150 comprises a plurality of beam deflector modules 152 disposed on a movable planar backing member 154. Beam deflector modules 152 are typically identical in construction to beam deflector modules 142 on stationary reflector assembly 140 and are disposed on backing member 154 in a pattern corresponding to the arrangement of beam deflector modules 142 in the stationary reflector assembly so that the translational reflector assembly 150 and stationary mirror assembly 140 are optically coupled together. As illustrated in FIG. 1, the calibration beam and the laser ranging beam (collectively illustrated by the phantom line "B" in FIGS. 1 and 2) enter beam path magnifier assembly 130 and are incident on the first beam deflector module 152 in translational reflector assembly 150; the beam path is reversed and displaced so that the beam is next incident on the first beam deflector module 142 in stationary reflector assembly 140, and so on back and forth between the two reflector assemblies 140, 150, defining a number of respective segments of the calibration optical path (each segment extending between respective beam deflector modules on the stationary and translational reflector assemblies).

Beam path magnifier assembly 130 further comprises a retroreflector 160 and a target 165 disposed to define the point on the calibration optical path at which the calibration beam and laser ranging beam are respectively reflected to follow a path to pass out of beam path magnifier assembly 130. Retroreflector 160 is disposed in the calibration beam path (that is, in the path of the light beam emanating from interferometer assembly 110) and comprises a highly reflective surface that reflects the calibration beam back along the same path that it traveled to be incident on the retroreflector. The reflected calibration beam passes back along the calibration optical path (being coupled between stationary reflector assembly and translational reflector assembly by respective ones of the beam deflector modules) until it exits beam path magnifier assembly 130, and is incident on beamsplitter 120, which in turn directs the returning calibration beam back into interferometer assembly 110.

Target 165 comprises a diffuse reflective material (such as white lambertian reflector, e.g., white paper or the like) that is disposed in the path of the laser ranging beam emanating from laser ranging assembly 50. The diffuse reflector results in some of the calibration beam light being deflected to pass out of the beam path magnifier assembly along a path such that it is detected by laser ranging system 50. Although the returning portion of the laser ranging beam passes through the same number of segments on the return leg, it also passes in the plane extending out of the plane of FIG. 1, the respective translational and stationary reflector assemblies having a lateral dimension (illustrated in FIG. 3c as dimension "X") in that plane that corresponds to the detector arrangement of laser ranging system 50 so as to be detected by the triangulation type laser ranging system 50.

Figures 3A, 3B:
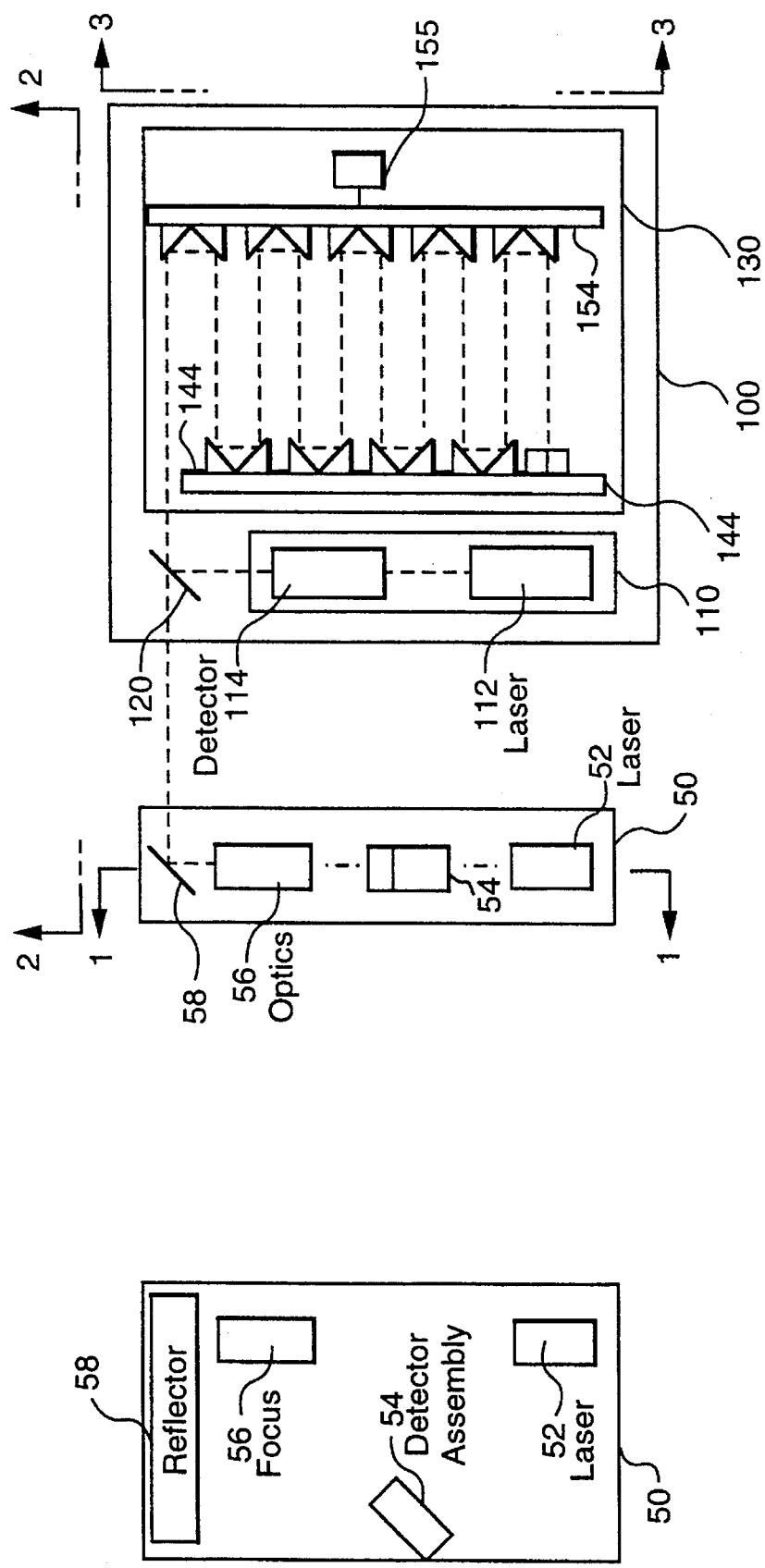
FIGS. 3a through 3d are partial schematic and partial block diagrams of one embodiment of the invention.
Figure 3C:
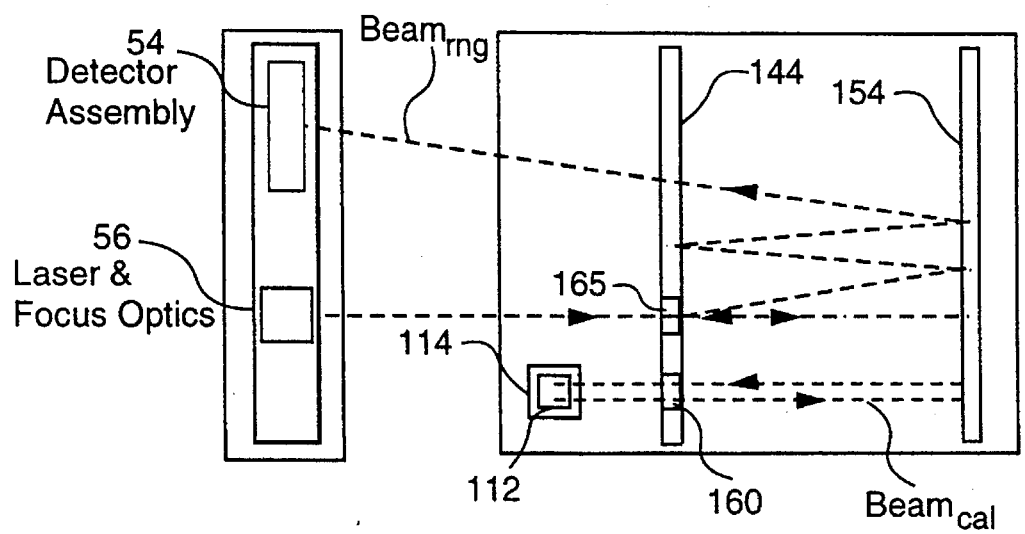
Figure 3D:
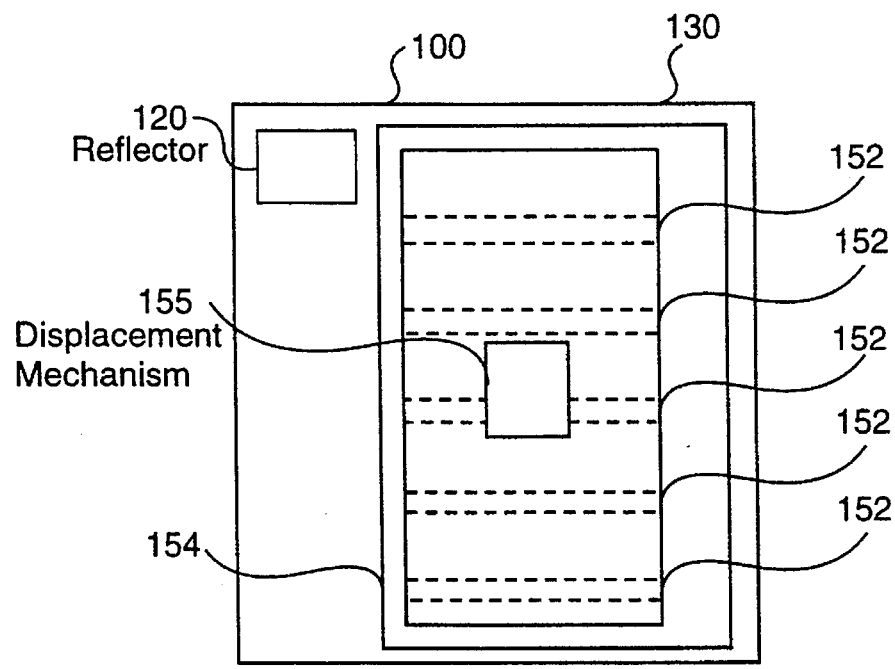

The relative placement components discussed above in different planes is illustrated in FIGS. 3a–3d. FIG. 3a is a side view similar to that represented in FIG. 1 and illustrates laser ranging system 50 and calibration device 100. FIG. 3b is an end-on view of laser ranging system 50, along the lines 3b—3b in FIG. 3a, showing the positions of components in common types of triangulation laser ranging systems, known in the art as discussed above. FIG. 3c is a top view of calibration device 100 and accompanying laser ranging system 50, along the lines 3c—3c in FIG. 3a, illustrating the respective light paths of triangulation laser ranging system 50 light beam ("Beam$_{rng}$" (shown in phantom)) and calibration device 100 light beam ("Beam$_{cal}$" (shown in phantom)). FIG. 3d is an end-on view of calibration device 100, along the lines 3d—3d in FIG. 3a, showing relative positions of some components in beam path magnifier assembly 130. As is seen in FIG. 3c, the Beamrng and Beamcal travel along separate paths within calibration device 100, with each beam being used in its respective detection device to determine measurements of the distance traveled along the paths between fixed backing plate 144 and movable backing plate 154."

Translational reflector assembly 150 (FIG.) further comprises a displacement mechanism 155 that moves translational reflector assembly backing member 154 along a selected path to displace the backing member with respect to stationary reflector assembly 140 (that is, move translational reflector assembly closer to or farther away from stationary reflector assembly 140) while maintaining the integrity of the calibration optical path. Translational reflector assembly is designed such that the optical path segments between stationary reflector assembly 140 and translational reflector assembly 150 are maintained during and after motion of the translational reflector assembly such that the path along which the calibration beam and the laser ranging beam pass remain unbroken up to retroreflector 160 and target 165 respectively, and thence back along the segments out of the calibration optical path out of beam magnifier assembly. Thus, with the translational displacement of reflector assembly 150 only the distance each beam passes along respective segments in the calibration optical path are changed. The actual displacement of reflector assembly with respect to stationary reflector assembly 140 is "magnified" by the number of segments in the calibration optical path, thus enabling beam magnifier assembly 130 to have compact dimensions while still providing a wide range of lengths of the calibration optical path so that the wide depth of range of laser ranging system can be calibrated.

Displacement assembly 155 typically comprises a motor coupled to planar backing member 154 so as to move backing member along a set path. Commonly an electric motor mechanically coupled to backing member 154 by, for example, a linear ball screw, or alternatively, a linear stepping motor or the like, is coupled to backing member 154 and is disposed to drive the backing member along rails or the like to maintain the integrity of the calibration optical path.

Thus, both the calibration beam and the laser ranging beam pass along the same calibration optical path length and measurement of that length by their respective detectors provides a basis for comparing and calibrating the laser ranging system. In operation, translational reflector assembly 150 is disposed in a "home" position, that is, a known position (usually at one end or the other of the mechanical limits of its translational motion) for which a the length of the calibration optical path length can be determined. The length of the calibration optical path in this known position constitutes the bias or offset distance for interferometer assembly 110. Starting from the "home" position, displacement assembly 155 operates to move translation reflector assembly along the predetermined path to another known position, typically the opposite mechanical limit of travel of translational reflector assembly 150. As the translational reflector assembly is displaced, for example, away from stationary reflector assembly 140, the length of the calibration optical path increases. This increase in calibration optical path length is detected by both laser ranging system 50 and by interferometer assembly 110 (e.g., by counting the interference fringe patterns caused by the interaction of the reflected portion of the calibration beam and the beam generated by laser source in the interferometer assembly). The range output signal of laser ranging system 50 and interferometer assembly 110 are respectively coupled to a comparison module 200; comparison of these two independent measurements of calibration optical path length provide a basis for building calibration tables for laser ranging system 50.

Figure 2:
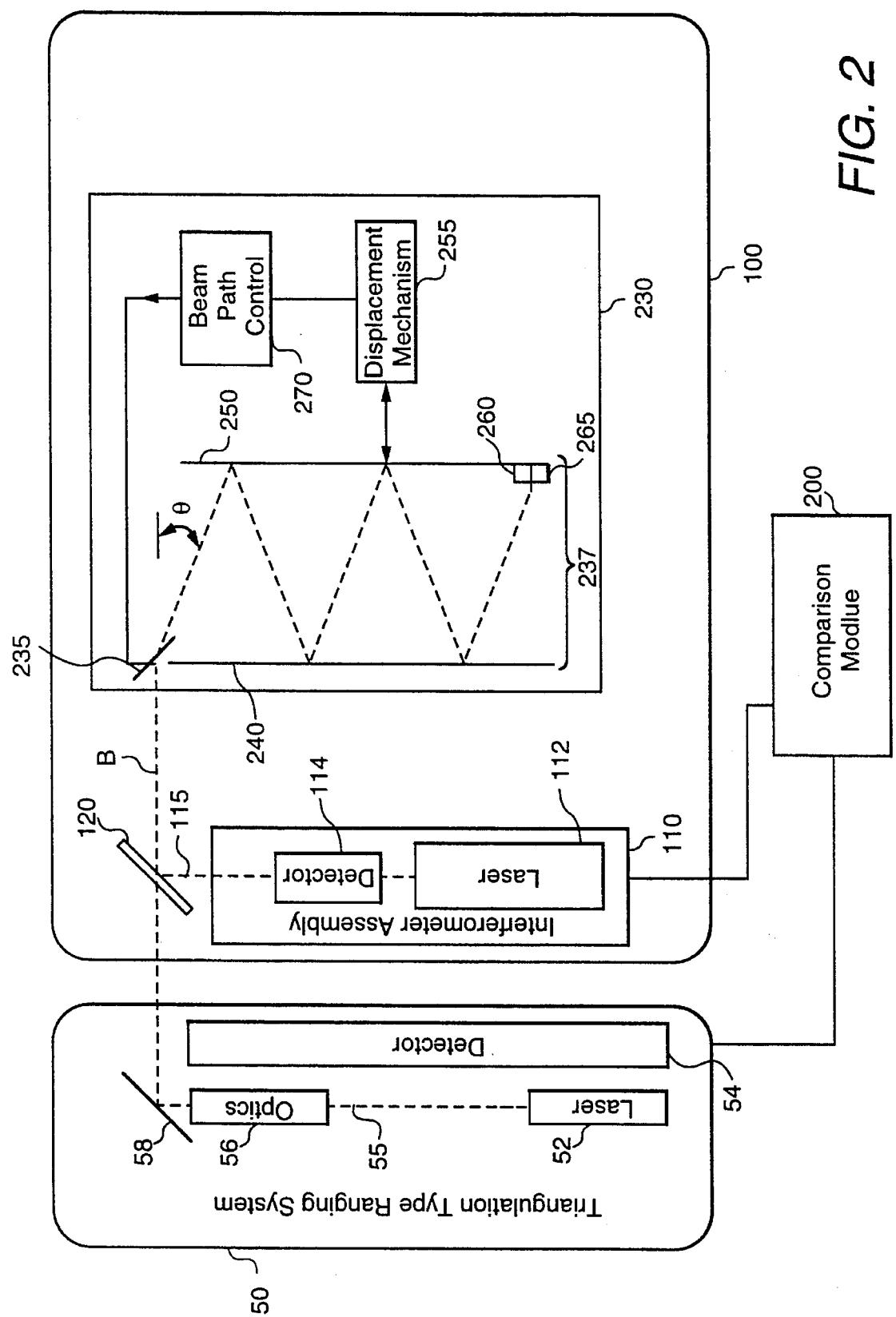
FIG. 2 is a partial schematic and partial block diagram view of a laser range system calibration device in accordance with another embodiment of this invention.

Another embodiment of the calibration device of the present system is illustrated in FIG. 2. The components in this embodiment do not differ substantially from the corresponding components described above for FIG. 1 except as noted below with respect to control of the calibration optical path length in beam path magnifier assembly 230. In this embodiment, calibration device 100 comprises a beam path magnifier assembly 230 that further comprises a rotatable beam coupling reflector 235 and an optical path assembly 237 optically coupled thereto. Beam coupling reflector 235 typically comprises a mirror disposed in the optical path of the calibration beam and laser ranging beam that are passing into beam path magnifier assembly 230 from beamsplitter 120. Reflector 235 is rotatable, that is, the orientation of the reflector is controllable so that the angle of incidence (and hence the angle of reflection) of the calibration beam and the laser ranging beam can be selectively controlled. Rotation (or orientation) of reflector 235 is typically via an electrically driven servo motor or the like; alternatively, a mechanical linkage to a displacement mechanism 255, discussed below, can be used to position reflector 235.

Optical path assembly 237 comprises a stationary mirror 240 and a translational mirror 250 that are disposed with their respective reflective surfaces facing the other. Optical path assembly 237 further comprises a retroreflector 260 and a target 265 (as described above) disposed on one of the mirror assemblies 240,250; for purposes of illustration and not limitation, retroreflector 260 and target 265 are shown in FIG. 2 disposed in proximity to one another (so as to be equidistant from for each beam along the calibration optical path length) on a portion of translation mirror 250 near the opposite end of the mirror from which these respective beams first strike the mirror upon entering optical path assembly 237. As noted above, retroreflector 260 is disposed to reflect the incident calibration beam back along the same optical path as the incident beam and target 265 is disposed to reflect the incident laser ranging beam back along the segments of the calibration optical path with sufficient deflection in the plane perpendicular to the plane of FIG. 2 so that the returning laser ranging beam is detected by the triangulation type laser ranging system 50.

Translational mirror 250 is coupled to displacement mechanism 255 that is adapted to displace translational mirror 250 with respect to stationary mirror 240 while maintaining the integrity of the optical path therebetween, e.g., as described above with respect to the arrangement shown in FIG. 1.

In this embodiment, rotatable beam coupling reflector 235 is disposed to deflect both the calibration beam and the laser ranging beam by angle θ prior to the beams entering optical path assembly 237 (the illustrated magnitude of angle θ being selected for purposes of illustration and not limitation). The calibration beam and the laser ranging beam pass along multiple respective segments between reflections off of translational mirror 250 and stationary mirror 240 prior to being incident on retroreflector 160 and target 165 respectively, at which time the respective beams are reflected back along the corresponding segments, with the beams passing in the opposite direction, as described above. Interferometer assembly and 110 and laser ranging system 50 determine the distance maveled by the respective light beams passing along the calibration optical beam path; further, as noted above, displacement of translational mirror 250 with respect to stationary mirror 240 causes a change in the length of the calibration optical beam path, the change in length being "multiplied" or a function of the number of segments the beams pass along between the translational and stationary mirrors in passing through optical path assembly 237.

Beam coupling reflector 235 and displacement mechanism 255 are each respectively coupled to a beam path controller 270 which provides signals to control the respective positions of these components; the position of beam coupling reflector 235 and translation mirror 250 with respect to stationary mirror 240 determine beam path length, with the combination providing a very large range of calibration optical path lengths. Alternatively, if rotatable reflector 235 is positioned by, e.g., a mechanical linkage from displacement assembly 255, reflector 235 need not be directly coupled to controller 270. Operation of this embodiment of the invention corresponds to that described above in that the calibration evolution begins with translational mirror 250 in a "home" position (e.g., a position with a known bias or offset distance from the length measured in that position by laser ranging system 50); translational mirror 250 is then displaced with corresponding motion of beam coupling reflector 235 to change the length of the calibration beam path over a desired range of lengths. The length measurements (made at the same corresponding conditions) of laser ranging system 50 and interferometer assembly 110 are each coupled to comparison module 200 to provide calibration data for the laser ranging system.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A calibration device for a laser ranging system, the calibration device comprising:

an interferometer assembly comprising a calibration beam generator and an interferometer detector; and a beam path magnifier assembly optically coupled to said interferometer assembly to receive a calibration beam therefrom and to said laser ranging system to receive a laser ranging beam therefrom, said beam path magnifier assembly comprising means for varying a folded calibration optical path length, a retroreflector disposed to reflect said calibration beam to said interferometer assembly, and a target disposed to reflect said laser ranging beam to said laser ranging system, said retroreflector and said target being disposed in said beam path magnifier assembly such that said calibration beam and said laser ranging beam each respectively travel the same distance from entering said beam path magnifier assembly to said corner cube and said target;

said means for varying said optical path length further comprising displaceable optical components disposed such that said folded calibration optical path length is determined by more than two reflections within said beam path magnifier assembly.

2. The device of claim 1 wherein beam path magnifier assembly comprises a stationary reflector assembly and a translational reflector assembly, said stationary reflector assembly and said translational reflector assembly each comprising a plurality of beam deflector modules disposed so as to define a folded calibration optical path having a plurality of segments between said stationary and said translational reflector assembles, said folded calibration optical path further being defined by said retroreflector and said target disposed along said path so as to respectively cause redirection of said calibration beam and said laser ranging beam.

3. The device of claim 2 wherein said means for varying a folded calibration optical path length comprises a displacement mechanism coupled to said translational reflector assembly, said displacement mechanism being disposed such that displacement of said translational reflector assembly selectively varies the distance between said translational reflector assembly and said stationary reflector assembly while maintaining the integrity of said folded calibration optical path, the length of said path being a function of the number of segments in the optical path and the displacement said translational reflector assembly with respect to said stationary reflector assembly.

4. The device of claim 1 wherein said beam path magnifier assembly comprises a rotatable beam coupling reflector and an optical path assembly optically coupled thereto, the beam coupling reflector and said optical path assembly defining said folded calibration optical path length, said rotatable beam coupling reflector being disposed to receive the incident calibration beam and said incident laser ranging beam and to deflect each of said beams at a selected deflection angle into said optical path assembly.

5. The device of claim 4 wherein said optical path assembly comprises a stationary mirror and a translational mirror, said stationary and said translational mirrors being disposed with their respective reflective surfaces facing the other and so as to receive said laser ranging beam and said calibration beam from said rotatable beam coupling reflector.

6. The device of claim 5 wherein said retroreflector and said target are each on one of said mirrors in said optical path assembly, said retroreflector and said target being disposed in proximity to one another to respectively receive said calibration beam and said laser ranging beam at a point along said folded calibration optical path length equidistant from said rotatable beam coupling reflector.

7. The device of claim 5 wherein said means for varying a folded calibration optical path length comprises a displacement mechanism coupled to said translational mirror so as to displace said mirror in correspondence with the deflection angle of said rotatable beam coupling reflector, said displacement mechanism being disposed such that displacement of said translational mirror selectively varies the distance between said translational mirror and said stationary mirror while maintaining the integrity of said folded calibration optical path therebetween, the length of said folded calibration optical path being a function of the distance between said stationary and said translational mirrors and the beam deflection angle of said rotatable beam coupling reflector.

8. The device of claim 1 further comprising an optical coupling mechanism to direct said calibration beam and said laser ranging beam along parallel paths into beam path magnifier assembly.

9. The device of claim 1 wherein said laser ranging system comprises a triangulation type laser ranger having a first lateral dimension selected to provide a desired range capability and said beam path magnifier assembly has a corresponding first lateral dimension that is at least as great as the laser ranger first lateral dimension.

10. The device of claim 1 wherein said interferometer assembly is coupled to said beam path magnifier assembly such that the calibration beam reflected from said retroreflector passes through said beam path magnifier assembly along the same path prior to striking said retroreflector and after striking said retroreflector so as to generate interference fringe patterns at said interferometer assembly, the interference fringe patterns corresponding to the length of said folded calibration optical path length.

11. The device of claim 10 wherein said laser ranging system and said interferometer assembly are each coupled to a comparison module so as to provide respective range measurements of the length of said folded calibration optical path, whereby calibration data for said laser ranging system is generated.

* * * * *